US009069882B2

(12) United States Patent
Diament et al.

(10) Patent No.: US 9,069,882 B2
(45) Date of Patent: Jun. 30, 2015

(54) MAPPING AND BOOSTING OF TERMS IN A FORMAT INDEPENDENT DATA RETRIEVAL QUERY

(71) Applicant: International Business Machines Corporation, Armonk, NY (US)

(72) Inventors: Judah M. Diament, Bergenfield, NJ (US); Aliza R. Heching, Bergenfield, NJ (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 13/746,440

(22) Filed: Jan. 22, 2013

(65) Prior Publication Data

US 2014/0207790 A1    Jul. 24, 2014

(51) Int. Cl.
G06F 17/30    (2006.01)
(52) U.S. Cl.
CPC ................. *G06F 17/30979* (2013.01)
(58) Field of Classification Search
CPC ............ G06F 17/30713; G06F 17/30707; G06F 17/3053; G06F 17/30979
USPC ........................................................ 707/748
See application file for complete search history.

(56) References Cited

U.S. PATENT DOCUMENTS

| 5,265,065 | A  | * | 11/1993 | Turtle ................................. | 1/1 |
| 5,297,039 | A  | * | 3/1994  | Kanaegami et al. .................. | 1/1 |
| 5,317,647 | A  | * | 5/1994  | Pagallo ........................... | 382/161 |
| 5,418,948 | A  | * | 5/1995  | Turtle ............................. | 707/700 |
| 5,442,781 | A  | * | 8/1995  | Yamagata ...................... | 707/779 |
| 5,937,422 | A  | * | 8/1999  | Nelson et al. .................. | 715/206 |
| 6,665,662 | B1 | * | 12/2003 | Kirkwood et al. ................... | 1/1 |
| 6,766,320 | B1 | * | 7/2004  | Wang et al. ........................ | 1/1 |
| 6,772,150 | B1 | * | 8/2004  | Whitman et al. ............. | 707/721 |
| 6,947,920 | B2 | * | 9/2005  | Alpha .................................. | 1/1 |
| 7,502,786 | B2 | * | 3/2009  | Liu et al. .............................. | 1/1 |
| 7,636,714 | B1 | * | 12/2009 | Lamping et al. .................... | 1/1 |
| 7,752,220 | B2 | * | 7/2010  | Weyand et al. ............... | 707/767 |
| 7,756,855 | B2 | * | 7/2010  | Ismalon ........................ | 707/713 |
| 7,984,044 | B2 | * | 7/2011  | Iwayama et al. .............. | 707/719 |
| 8,122,022 | B1 | * | 2/2012  | Baker ........................... | 707/736 |
| 8,122,431 | B2 | * | 2/2012  | De Becdelievre et al. .... | 717/114 |
| 8,219,385 | B2 |   | 7/2012  | Sprecher et al. |  |
| 8,219,522 | B2 |   | 7/2012  | Johnston et al. |  |

(Continued)

OTHER PUBLICATIONS

Liu, Ying, et al., "TableSeer: Automatic Table Metadata Extraction and Searching in Digital Libraries", JCDL '07, Vancouver, British Columbia, Canada, Jun. 18-23, 2007, pp. 91-100.*

(Continued)

*Primary Examiner* — Robert Stevens
(74) *Attorney, Agent, or Firm* — William J. Stock; Hoffman Warnick LLC (57) ABSTRACT

Aspects of the present invention provide a tool for retrieving data in response to a query in any format. In an embodiment, each query term of the query is analyzed to determine whether it corresponds to either a domain keyword or a formula designator. If a formula designator is retrieved, each formula term associated with the formula designator is mapped to a domain keyword. Each of the domain keywords, the formula designators, and the mapped formula terms are boosted. A dataset is searched using a structured search query that includes all boosted terms, as well as any remaining query terms that do not correspond to one of the boosted terms.

25 Claims, 7 Drawing Sheets

(56) References Cited

U.S. PATENT DOCUMENTS

| | | | |
|---|---|---|---|
| 8,577,907 B1 * | 11/2013 | Singhal et al. | 707/759 |
| 8,601,015 B1 * | 12/2013 | Wolfram et al. | 707/759 |
| 8,639,684 B2 * | 1/2014 | Djabarov | 707/721 |
| 2002/0059204 A1 * | 5/2002 | Harris | 707/3 |
| 2002/0169755 A1 * | 11/2002 | Framroze et al. | 707/3 |
| 2003/0014398 A1 * | 1/2003 | Ohta et al. | 707/3 |
| 2003/0069880 A1 * | 4/2003 | Harrison et al. | 707/3 |
| 2005/0278285 A1 * | 12/2005 | Cohen et al. | 707/1 |
| 2006/0122997 A1 * | 6/2006 | Lin | 707/5 |
| 2007/0016612 A1 * | 1/2007 | James et al. | 707/104.1 |
| 2007/0088695 A1 * | 4/2007 | Bleyendaal et al. | 707/5 |
| 2008/0104071 A1 | 5/2008 | Pragada et al. | |
| 2008/0189268 A1 * | 8/2008 | Au | 707/5 |
| 2009/0012926 A1 * | 1/2009 | Ishikawa et al. | 706/47 |
| 2009/0019015 A1 * | 1/2009 | Hijikata | 707/3 |
| 2009/0240680 A1 * | 9/2009 | Tankovich et al. | 707/5 |
| 2009/0248674 A1 * | 10/2009 | Suzuki et al. | 707/5 |
| 2010/0185666 A1 * | 7/2010 | Crow et al. | 707/770 |
| 2010/0312782 A1 * | 12/2010 | Li et al. | 707/769 |
| 2011/0125764 A1 * | 5/2011 | Carmel et al. | 707/749 |
| 2011/0264647 A1 * | 10/2011 | Lu et al. | 707/713 |
| 2011/0307477 A1 | 12/2011 | Dasari et al. | |
| 2011/0314010 A1 * | 12/2011 | Ganti et al. | 707/728 |
| 2012/0158703 A1 * | 6/2012 | Li et al. | 707/723 |
| 2012/0191716 A1 | 7/2012 | Omoigui | |
| 2012/0193869 A1 | 8/2012 | Hanamoto | |
| 2014/0046951 A1 * | 2/2014 | Redfern et al. | 707/741 |

OTHER PUBLICATIONS

Sun, Bingjun, et al., "Extraction and Search of Chemical Formulae in Text Documents on the Web", WWW 2007, Banff, Alberta, Canada, May 8-12, 2007, pp. 251-260.*

Mišutka, Jozef, et al., "Extending Full Text Search Engine for Mathematical Content", DML 2008, Masaryk University © 2008, pp. 55-67.*

Wren, Jonathan D., et al., "Biomedical term mapping databases", Nucleic Acids Research, vol. 33, Database issue, Oxford University Press, © 2005, pp. D289-D293.*

Zanibbi, Richard, et al., "Recognition and retrieval of mathematical expressions", IJDAR (2012), vol. 15, Springer-Verlag, © 2011, pp. 331-357.*

Zhao, Jin, et al., "Math Information Retrieval: User Requirements and Prototype Implementation", JCDL '08, Pittsburgh, PA, Jun. 16-20, 2008, pp. 187-196.*

Miner, Robert, et al., "An Approach to Mathematical Search Through Query Formulation and Data Normalization", MKM/Calculemus 2007, LNAI 4573, Springer-Verlag, Berlin, © 2007, pp. 342-355.*

Sojka, Petr, et al., "Indexing and Searching Mathematics in Digital Libraries", Calculemus/MKM 2011, LNAI 6824, Springer-Verlag, Berlin, © 2011, pp. 228-243.*

Miller, Bruce R., et al., "Technical aspects of the Digital Library of Mathematical Functions", Annals of Mathematics and Artificial Intelligence, vol. 38, Kluwer Academic Publishers, The Netherlands, © 2003, pp. 121-136.*

Kohlhase, Michael, et al., "MathWebSearch 0.4—A Semantic Search Engine for Mathematics", © 2008, downloaded from: mathweb.org/projects/mws/pubs/mkm08.pdf, pp. 1-13.*

Cîrlănaru, Mihai, et al., "Authoring and Publishing Units and Quantities in Semantic Documents", ESWC 2011 Workshops, Herkalion, Greece, May 29-30, 2011, 202-216.*

Liu, King-Lup, et al., "Discovery of Similarity Computations of Search Engines", CIKM 2000, McLean, VA, © ACM 2000, pp. 290-297.*

Libbrecht, Paul, "Enhanced Dictionary", Deliverable No. D15, The LeActiveMath Consortium, Jun. 2005, 31 pages.*

Zhang, Jin, et al., "Visualization of Health-Subject Analysis Based on Query Term Co-occurrences", Journal of the American Society for Information Science and Technology, vol. 59, No. 12, © 2008, pp. 1933-1947.*

Salton, Gerard, et al., "Automatic Text Structuring and Retrieval—Experiments in Automatic Encyclopedia Searching", SIGIR '91, Chicago, IL, Oct. 13-16, 1991, pp. 21-30.*

Zhou, Qi, et al., "SPARK: Adapting Keyword Query to Semantic Search", ISWC/ASWC 2007, LNCS 4825, Springer-Verlag, Berlin, © 2007, pp. 694-707.*

Rhodes, James, et al., "Mining Patents Using Molecular Similarity Search", Pacific Symposium on Biocomputing, vol. 12, © 2007, pp. 304-315.*

Kohlhase, Michael, et al., "A Search Engine for Mathematical Formulae", AISC 2006, LNAI 4120, Springer-Verlag, Berlin, © 2006, pp. 241-253.*

Jones, Rosie, et al., "Generating Query Substitutions", WWW 2006, Edinburgh, Scotland, May 23-26, 2006, pp. 387-396.*

Ginev, D., et al., "An Architecture for Linguistic and Semantic Analysis on the ARXMLIV Corpus", AST 2009, Lübeck, Germany, Oct. 2, 2009, 23 pages.*

Kärger, Philipp, et al., "Querying Heterogeneous and Distributed Learning Object Repositories via Ontology-Based Mediation", ICALT 2006, Kerkrade, The Netherlands, Jul. 5-7, 2006, pp. 845-846.*

Kohlhase, Michael, et al., "MathWebSearch 0.5: Scaling an Open Formula Search Engine", CICM 2012, Bremen, Germany, Jul. 8-13, 2012, LNAI 7362, Springer-Verlag, Berlin, pp. 342-357.*

Ludwig, Simone A., et al., "Matchmaking Framework for Mathematical Web Services", Journal of Grid Computing, vol. 4, © Springer 2006, pp. 33-48.*

Anderson, Nicole, "Putting Search in Context: Dynamically-Weighted Information Fusion to Improve Search Results", ITNG, Las Vegas, NV, Apr. 11-13, 2011, pp. 66-71.*

Kim, Shinil, et al., "Mathematical Equation Retrieval Using Plain Words as a Query", CIKM '12, Maui, HI, Oct. 29-Nov. 2, 2012, pp. 2407-2410.*

Normann, Immanuel, et al., "Extended Formula Normalization for $\epsilon$-Retrieval and Sharing of Mathematical Knowledge", MKM/Calculemus 2007, LNAI 4573, Springer-Verlag, Berlin, © 2007, pp. 356-370.*

Doush, Iyad Abu, et al., "Annotations, Collaborative Tagging, and Searching Mathematics in E-Learning", International Journal of Advanced Computer Science and Applications, vol. 2, No. 4, © 2011, pp. 30-39.*

Drumm et al., "QuickMig—Automatic Schema Matching for Data Migration Projects," Nov. 2007, 10 pages, CIKM '07, Lisboa, Portugal.

Miller et al., "Schema Mapping as Query Discovery," 2000, pp. 77-88, Proceedings of the 26th VLDB Conference, Cairo, Egypt.

Schiefer et al., "Event-Driven Rules for Sensing and Responding to Business Situations," Jun. 2007, 8 pages, DEBS '07, Ontario, Canada.

Vetterli et al., "Metadata Standards for Data Warehousing: Open Information Model vs. Common Warehouse Metamodel," Sep. 2000, 8 pages, ACM SIGMOD Record vol. 29 Issue 3.

Xie et al., "EIAW: Towards a Business-friendly Data Warehouse Using Semantic Web Technologies," 2007, pp. 857-870, The Semantic Web. Lecture Notes in Computer Science vol. 4825.

* cited by examiner

| Entry 302 | Local Name 304 | Dataset 306 | Type 308 | Boost 309 |
|---|---|---|---|---|
| Sales | | T104 | Table | 5 |
| Regional Quarterly Sales | Second Quarter Sales for Central Area | T104 | Table Description | 3 |
| Product | | T104 | Column Name (Key) | 10 |
| Customer | Buyer | T104 | Column Name | 9 |
| Name of the purchaser | | T104 | Column Description | 7 |
| Receipts | Amount | T104 | Column Name | 9 |
| Received payment for the product | | T104 | Column Description | 7 |
| Received from XYZ Corp. for BizSoft | | T104 | Value Description | 7 |

MAPPING AND BOOSTING OF TERMS IN A FORMAT INDEPENDENT DATA RETRIEVAL QUERY

TECHNICAL FIELD

The subject matter of this invention relates generally to data retrieval. More specifically, aspects of the present invention provide a solution for data retrieval in response to a query.

BACKGROUND

As information technology has developed, the amount of data in storage has increased dramatically. Storage systems have developed from simple solutions that serve a single machine to vast storage repositories that provide storage for large networks of computers. These storage systems often continue to grow over time, with new data and/or data structures being added constantly.

This evolution of storage systems has precipitated a parallel development in the logic used to retrieve the data therein. One such strategy involves storing data in data tables. These tables can be developed in such a way as to organize an object together with information regarding the object. Further, relationships can be established between the tables. Information from these tables can then be retrieved using a query having a predefined structure, which conforms to the organizational structure of the tables.

SUMMARY

In general, aspects of the present invention provide a tool for retrieving data in response to a query in any format. In an embodiment, each query term of the query is analyzed to determine whether it corresponds to either a domain keyword or a formula designator. If a formula designator is retrieved, each formula term associated with the formula designator is mapped to a domain keyword. Each of the domain keywords, the formula designators, and the mapped formula terms are boosted. A dataset is searched using a structured search query that includes all boosted terms, as well as any remaining query terms that do not correspond to one of the boosted terms.

A first aspect of the invention provides a method for retrieving data, comprising: analyzing each query term of a format-independent query for data retrieval to determine whether the query term corresponds to at least one of: a domain keyword or a formula designator; mapping a domain keyword to a set of query terms associated with a retrieved formula designator; creating a unique weighted boosting for each of the domain keywords, the formula designator, and the mapped formula terms; searching a dataset using a structured search query that includes all boosted terms and any remaining query terms that do not correspond to one of the boosted terms.

A second aspect of the invention provides a system for retrieving data, comprising at least one computer device that performs a method, comprising: analyzing each query term of a format-independent query for data retrieval to determine whether the query term corresponds to at least one of: a domain keyword or a formula designator; mapping a domain keyword to a set of query terms associated with a retrieved formula designator; creating a unique weighted boosting for each of the domain keywords, the formula designator, and the mapped formula terms; searching a dataset using a structured search query that includes all boosted terms and any remaining query terms that do not correspond to one of the boosted terms.

A third aspect of the invention provides a computer program product stored on a computer readable storage medium, which, when executed performs a method for retrieving data, comprising: analyzing each query term of a format-independent query for data retrieval to determine whether the query term corresponds to at least one of: a domain keyword or a formula designator; mapping a domain keyword to a set of query terms associated with a retrieved formula designator; creating a unique weighted boosting for each of the domain keywords, the formula designator, and the mapped formula terms; searching a dataset using a structured search query that includes all boosted terms and any remaining query terms that do not correspond to one of the boosted terms.

A fourth aspect of the invention provides a method for deploying an application for retrieving data, comprising: providing a computer infrastructure being operable to: analyze each query term of a format-independent query for data retrieval to determine whether the query term corresponds to at least one of: a domain keyword or a formula designator; map a domain keyword to a set of query terms associated with a retrieved formula designator; create a unique weighted boosting for each of the domain keywords, the formula designator, and the mapped formula terms; search a dataset using a structured search query that includes all boosted terms and any remaining query terms that do not correspond to one of the boosted terms.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As indicated above, aspects of the present invention provide a solution for retrieving data in response to a query in any format. In an embodiment, each query term of the query is analyzed to determine whether it corresponds to either a domain keyword or a formula designator. If a formula designator is retrieved, each formula term associated with the formula designator is mapped to a domain keyword. Each of the domain keywords, the formula designators, and the mapped formula terms are boosted. A dataset is searched using a structured search query that includes all boosted terms, as well as any remaining query terms that do not correspond to one of the boosted terms.

Figure 1:
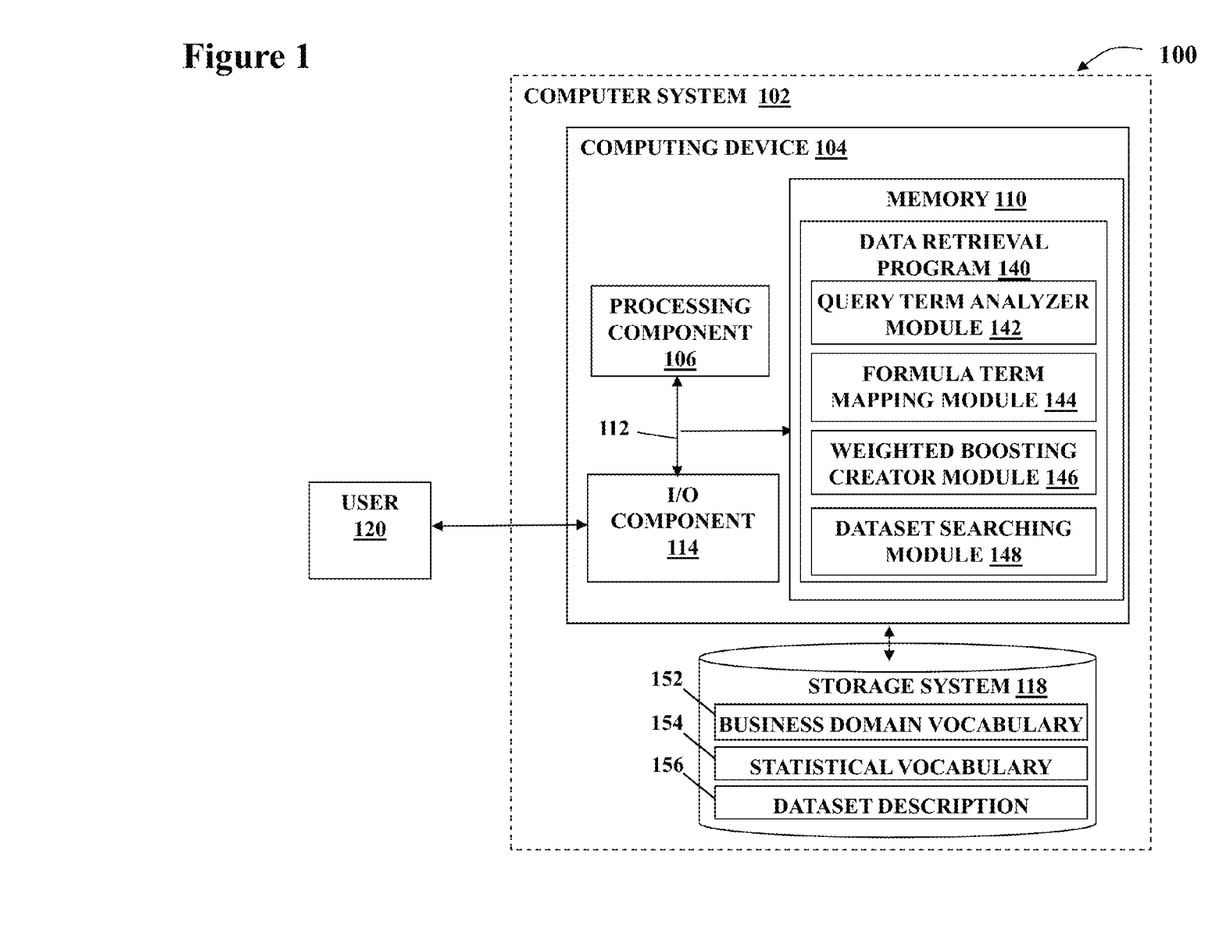
FIG. 1 shows an illustrative computer system according to embodiments of the present invention.

Turning to the drawings, FIG. 1 shows an illustrative environment 100 for retrieving data. To this extent, environment 100 includes a computer system 102 that can perform a process described herein in order to retrieve data. In particular, computer system 102 is shown including a computing device 104 that includes a data retrieval program 140, which makes computing device 104 operable to retrieve data by performing a process described herein.

Computing device 104 is shown including a processing component 106 (e.g., one or more processors), a memory 110, a storage system 118 (e.g., a storage hierarchy), an input/output (I/O) component 114 (e.g., one or more I/O interfaces and/or devices), and a communications pathway 112. In general, processing component 106 executes program code, such as data retrieval program 140, which is at least partially fixed in memory 110. To this extent, processing component 106 may comprise a single processing unit, or be distributed across one or more processing units in one or more locations.

Memory 110 also can include local memory, employed during actual execution of the program code, bulk storage (storage 118), and/or cache memories (not shown) which provide temporary storage of at least some program code in order to reduce the number of times code must be retrieved from bulk storage 118 during execution. As such, memory 110 may comprise any known type of temporary or permanent data storage media, including magnetic media, optical media, random access memory (RAM), read-only memory (ROM), a data cache, a data object, etc. Moreover, similar to processing component 116, memory 110 may reside at a single physical location, comprising one or more types of data storage, or be distributed across a plurality of physical systems in various forms.

While executing program code, processing component 106 can process data, which can result in reading and/or writing transformed data from/to memory 110 and/or I/O component 114 for further processing. Pathway 112 provides a direct or indirect communications link between each of the components in computer system 102. I/O component 114 can comprise one or more human I/O devices, which enable a human user 120 to interact with computer system 102 and/or one or more communications devices to enable a system user 120 to communicate with computer system 102 using any type of communications link.

To this extent, data retrieval program 140 can manage a set of interfaces (e.g., graphical user interface(s), application program interface, and/or the like) that enable human and/or system users 120 to interact with data retrieval program 140. Users 120 could include system administrators and/or clients who need to store and/or retrieve data in a storage system environment, among others. Further, data retrieval program 140 can manage (e.g., store, retrieve, create, manipulate, organize, present, etc.) the data in storage system 118, including, but not limited to a business domain vocabulary 152, a statistical vocabulary 154, and/or a dataset description 156, using any solution.

In any event, computer system 102 can comprise one or more computing devices 104 (e.g., general purpose computing articles of manufacture) capable of executing program code, such as data retrieval program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, data retrieval program 140 can be embodied as any combination of system software and/or application software. In any event, the technical effect of computer system 102 is to provide processing instructions to computing device 104 in order to retrieve data.

Further, data retrieval program 140 can be implemented using a set of modules 142-148. In this case, a module 142-148 can enable computer system 102 to perform a set of tasks used by data retrieval program 140, and can be separately developed and/or implemented apart from other portions of data retrieval program 140. As used herein, the term "component" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing component 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 can have only a portion of data retrieval program 140 fixed thereon (e.g., one or more modules 142-148). However, it is understood that computer system 102 and data retrieval program 140 are only representative of various possible equivalent computer systems that may perform a process described herein. To this extent, in other embodiments, the functionality provided by computer system 102 and data retrieval program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, data retrieval program 140 enables computer system 102 to retrieve data. To this extent, data retrieval program 140 is shown including a query term analyzer module 142, a formula term mapping module 144, a weighted boosting creator module 146, and a dataset searching module 148.

Figure 2:
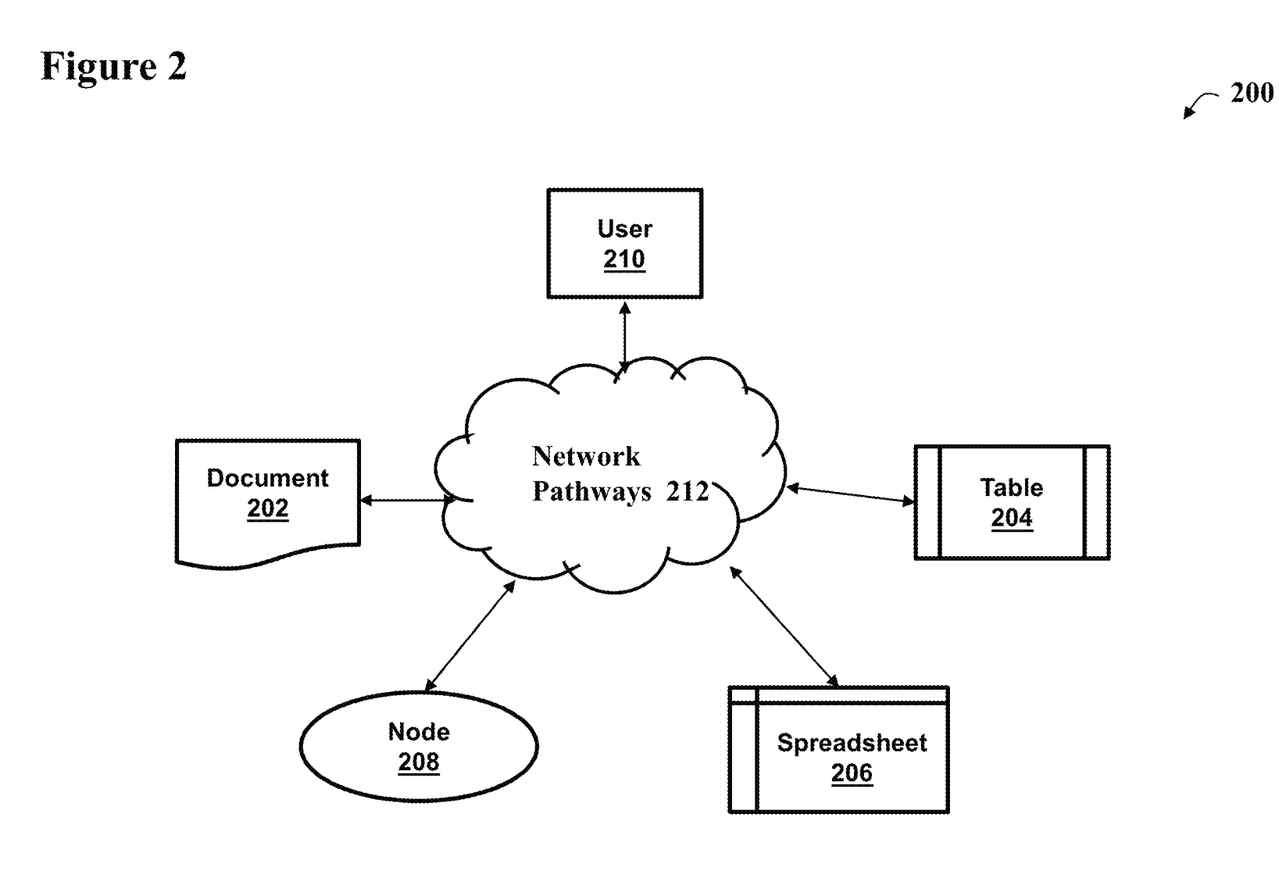
FIG. 2 shows a data network according to embodiments of the invention.

Referring now to FIG. 2, a data network 200 according to embodiments of the invention is shown. As illustrated, data network 200 includes a plurality of datasets 202, 204, 206, 208. As illustrated, data network 200 includes document 202 based dataset, which can include a document formed by a document-based system (e.g., enterprise software such as SAP, word processing documents, internal or external web pages or the like). Additionally or in the alternative, data network 200 can include a table-based dataset 204 (e.g., a relational database, or the like). Further, data network 200 can also or alternatively include a spreadsheet 206 based dataset, including, but not limited to a spreadsheet created with a spreadsheet application or the like. Alternatively or in addition, data network 200 can include a node-based 208 dataset, including, but not limited to object based data, hierarchical data storage, and/or the like. As shown, the datasets 202, 204, 206, 208 in data network 200 are accessible to a user 210 via a network, utilizing any solution. Although data network 200 is illustrated in FIG. 2 as containing multiple datasets of differing types, it is understood that the current invention would function in a homogeneous dataset environment as well. Further, it is understood that other types of datasets that are now known or later developed can be included within the scope of the invention. To this extent, the number and/or types of dataset illustrated herein should not be taken as limiting.

The inventors of the present invention have discovered that data retrieval strategies suffer from certain deficiencies. For example, the above-described table solution requires that all data be confined to a common table-structured format. To this extent, other storage structures, such as spreadsheets, forms, documents, or the like, may be inaccessible using this solution. Further, in an environment in which data and/or storage structures are constantly being added, it can become difficult to maintain consistent naming conventions. In addition, these naming conventions, consistent or not, are often not in a natural language and, as such, fail to provide those desiring to retrieve data with information that can be easily used to do so. For this reason, even a skilled database searcher may spend a large amount of time locating storage structures that contain the data and/or structuring a query in such a manner that the data can be retrieved. The difficulty is increased even further, when the user who needs to access the data does not have expertise in crafting structured queries, locating relevant storage structures, locating relevant data within storage structures, and/or performing statistical analysis of resulting data.

Figure 3:
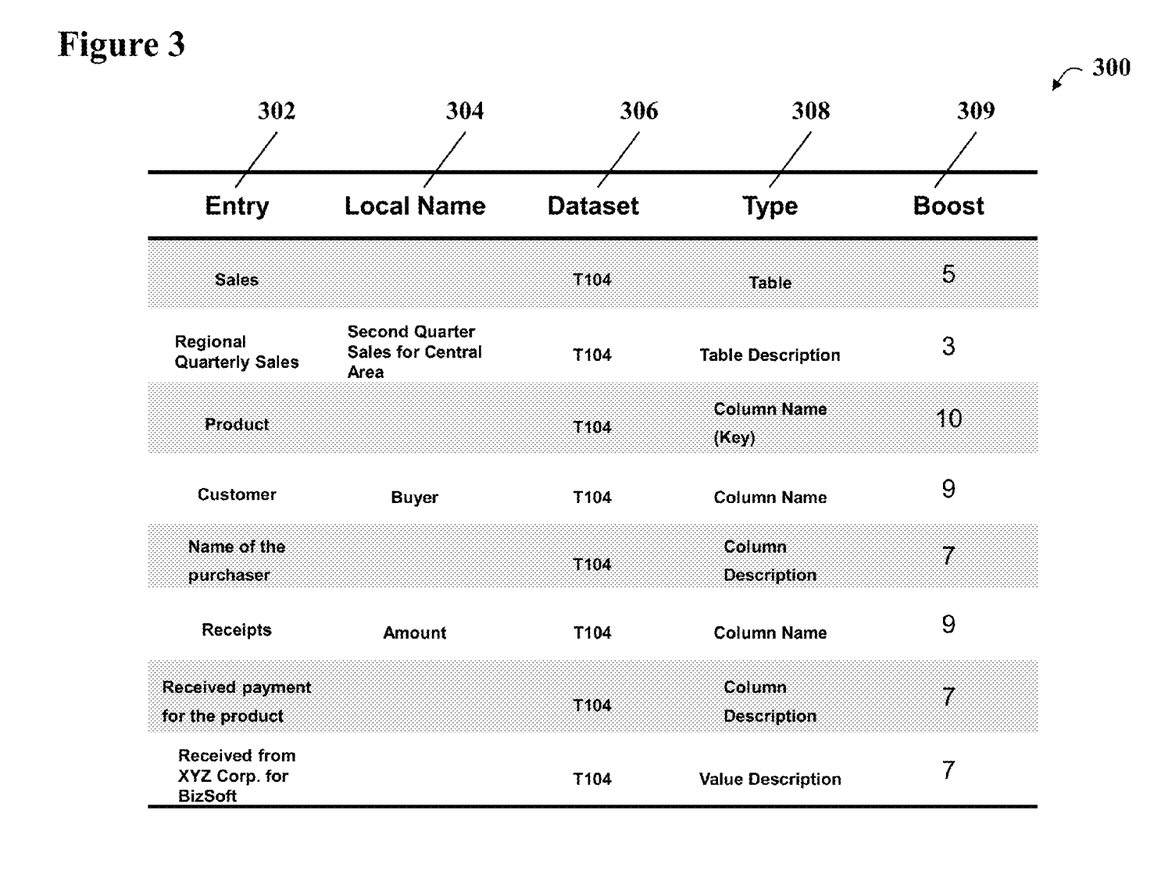
FIG. 3 shows an example dataset description according to embodiments of the invention.

Turning now to FIG. 3 in conjunction with FIG. 2, an example dataset description 300 according to an embodiment is shown. Dataset description 300 provides an index for user 210 to be able to access datasets 202, 204, 206, 208 in data network 200. To this extent, dataset description 300 can have a number of entries 302 that correspond to elements of a particular dataset. Entries for a particular dataset description 300 can be limited to one particular dataset 202, 204, 206, 208, or in the alternative, a plurality of datasets 202, 204, 206, 208, can be included in the same dataset description 300. In the case of multiple datasets 202, 204, 206, 208, a dataset field 306 in dataset description 300 can designate to which dataset 202, 204, 206, 208 each entry 302 belongs. Any entry 302 in dataset description 300 can also have a local name 304. To this extent, entries 302 act as a way of standardizing names for like data items which may have different local names 304 within the particular dataset 202, 204, 206, 208. As shown, the entry having the standardized name "Customer" in dataset description 300 has the local name 304 "Buyer" in dataset 306 "T104".

Further, each entry 302 in dataset description 300 can have a designation type 308 and a boost 309. Boosting refers to increasing (or decreasing) the relative importance assigned to an entity (such as a query term, query phrase, indexed field, indexed document, and/or the like) such as in a search system. This can be done in order to influence the results of one or more searches. In this case, all other things being equal, an entity with a higher boost value would be scored higher by the search engine. As applied to dataset description 300, boost 309 can be assigned to a particular entry 302 according to the designation type 308 of the entry 302. Additionally or in the alternative, boost 309 can be assigned to an entry 302 based on the dataset 306 in which the entry 302 is located. To this extent, a higher boost 309 number can be assigned to entries 302 having designation types 308 and/or located in specific datasets 306 that are deemed to be more likely to contain useful data. These boost 309 values can be used to rank returned data as will be shown. To this end, as shown, a boost 309 of 10 has been assigned to entry 302 "Product" because it has designation type 308 of both "column name" and "key"; a boost 309 of 9 has been assigned to entries 302 "Customer" and "Receipts" because they have designation type 308 of "column name"; a boost 309 of 7 has been assigned to entries 302 "Name of the purchaser" and "Received payment for the product" because they have the designation type 308 of "column description"; a boost 309 of 7 has been assigned to entry 302 "Received from XYZ Corp. for BizSoft" because it has the designation type 308 of "value description"; a boost 309 of 5 has been assigned to entry 302 "Sales" because it has the designation type 308 of "table"; and a boost 309 of 3 has been assigned to entries 302 "Regional Quarterly Sales" because it has the designation type 308 of "table description".

Figure 4:
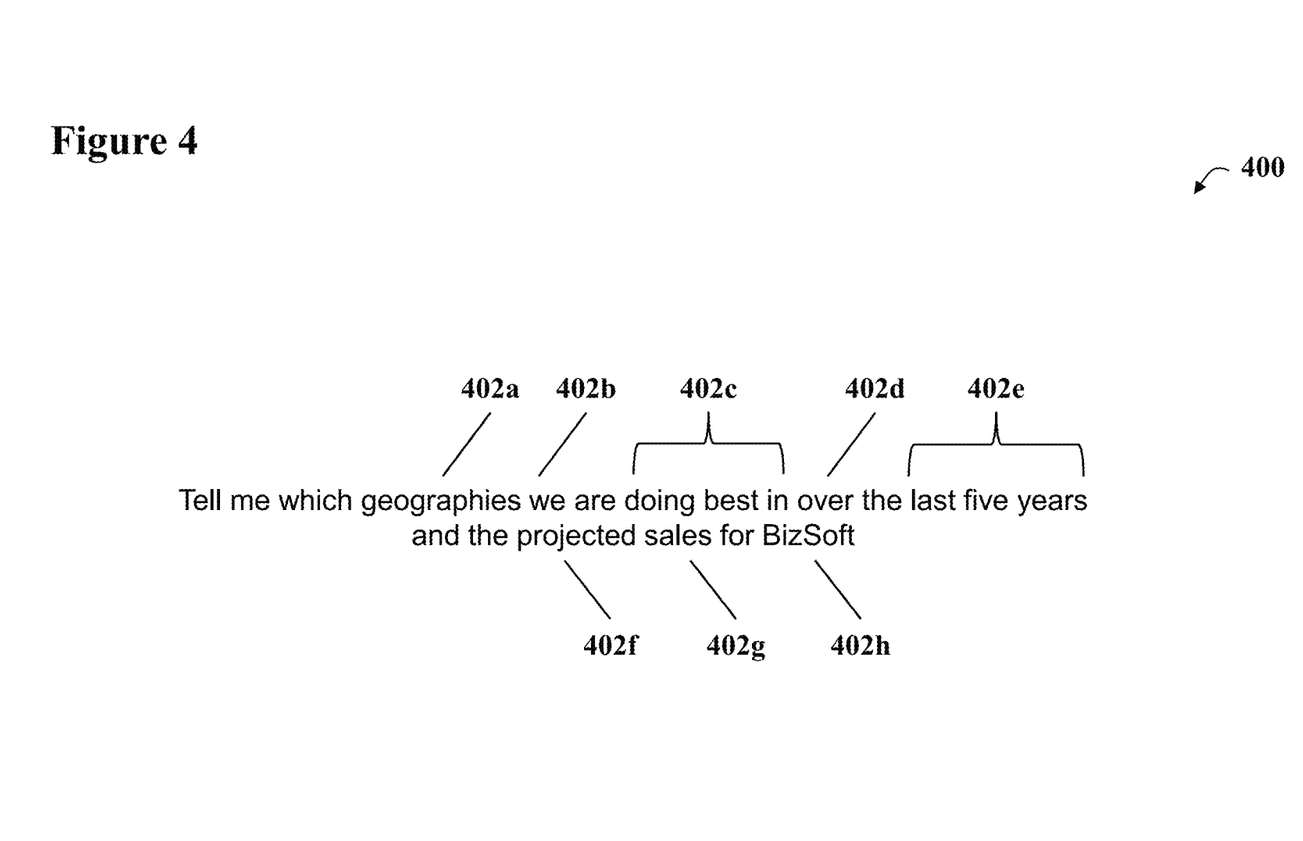
FIG. 4 shows an example of a query according to embodiments of the invention.

Turning now to FIG. 4, a query 400 according to embodiments of the invention is shown. Query 400 is an example of a query from a user 120 (FIG. 1) that data retrieval program 140 can use to retrieve data for the user 120. To this extent, query 400 does not have to be in any particular format. Rather, any format, including but not limited to a natural language query 400, such as that shown in FIG. 4 can be used by data retrieval program 140. Further, query 400 can be in the form of a statement, in the form of a question or any other format that is now known or later developed. In any case, query 400 has a set of query terms 402a-h that form the bounds of the query 400. Query terms 402a-h indicate what data user 120 desires to retrieve from the data network 200 (FIG. 2).

Referring now to FIG. 1 in conjunction with FIG. 4, computer system 102, executing query term analyzer module 142, analyzes each query term 402a-h of query 400. This analyzing is performed in order to determine whether the query terms correspond to either of a domain keyword or a formula designator found in a vocabulary, such as business domain vocabulary 152 or statistical vocabulary 154.

Figure 5:
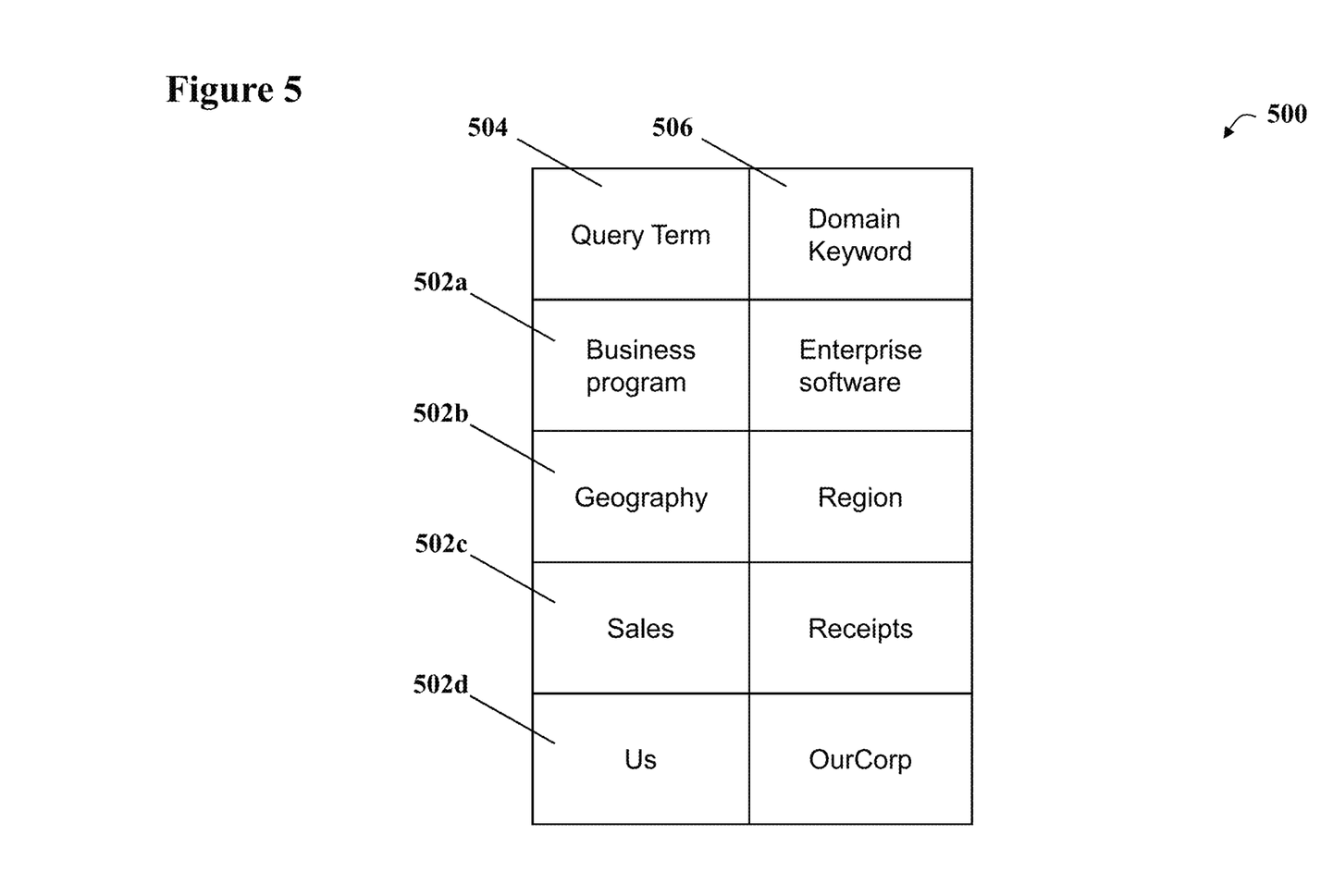
FIG. 5 shows an example business domain vocabulary according to embodiments of the invention.

Turning now to FIG. 5 (in conjunction with FIGS. 3 and 4), an example vocabulary 500 having domain keywords 506 according to embodiments of the invention is shown. Vocabulary 500 can be included in a business domain vocabulary 152 (FIG. 1) which includes a mapping of terms and/or formula elements with their business equivalents. Additionally or in the alternative, vocabulary 500 can be included in a statistical vocabulary 154 (FIG. 1), which includes a mapping of terms and/or formula elements with their statistical equivalents, and can contain any terms, formulas, etc., that are needed to perform a statistical analysis of the data returned by the query. As illustrated, vocabulary 500 includes a set of entries 502a-d. Each entry has one or more query terms 504 and corresponding domain keywords 506. Query terms 504 in vocabulary 500 include potential terms that might be found as query terms 402a-h in query 400. Because query 400 can be entered "freeform", e.g., in any format, query terms 504 in vocabulary 500 can include a large number of entries 502a-d to allow query term analyzer module 142 to find a corresponding domain keyword 506 for any query term 402a-h that a user 120 enters into a particular query 400. Similarly, domain keywords 504 include terms that can be found as entries 302 in data definition 300.

To this extent, vocabulary 500 provides a mapping that allows domain keywords 506 to be substituted for unformatted query terms 402*a-h* in query 400. For example, query term sales 402*f* "sales" of query 400 can be mapped to a domain keyword 506 that can be found in dataset description 300 (e.g., "receipts") via the mapping of entry 502*c*. Further, query terms 402*a-h* in query 400 can be mapped to an entry 502 in vocabulary 500 having a different tense using any solution. This can allow, for example, entry 502*b* to map query term 402*a* "geographies" to domain keyword 506 "region", even though "geography" and not "geographies" is found in vocabulary 500. Still further, synonyms for a query term 402*a-h* in query 400 can match query term 504 in business domain vocabulary using a dictionary, a thesaurus, or the like. For example, query term 402*b* "we" in query 400 can be recognized as a synonym for query term 504 "us" in vocabulary 500 and can be mapped to domain keyword 506 "OurCorp" via entry 502*d*.

Figure 6:
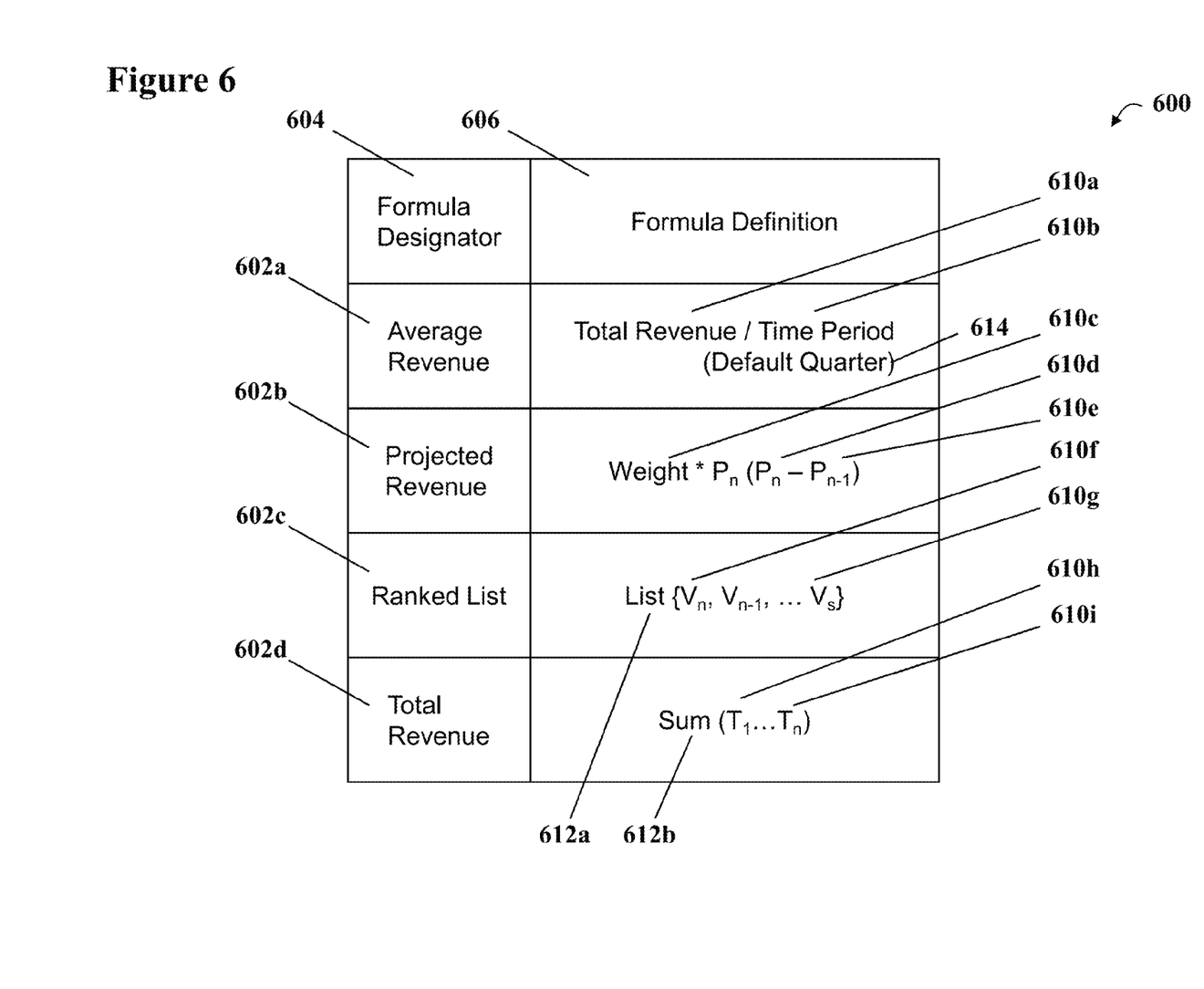
FIG. 6 shows an example statistical vocabulary according to embodiments of the invention.

Turning now to FIG. 6 (in conjunction with FIGS. 3, 4 and 5), an example vocabulary 600 having formula definitions 606 according to embodiments of the invention is shown. Vocabulary 600 can be included in the same vocabulary 500 as domain keywords 506 or, in the alternative, could be part of one or more separate vocabularies. In any case, as with vocabulary 500, vocabulary 600 can be included in a business domain vocabulary 152 (FIG. 1) and/or can be included in a statistical vocabulary 154 (FIG. 1). In any case, as illustrated, vocabulary 600 includes a set of formula entries 602*a-d*. Each formula entry 602*a-d* has one or more formula designators 604 and a corresponding formula definition 606. Formula designators 604 in vocabulary 600 can include potential terms that might be found as query terms 402*a-h* in query 400. In the alternative, query terms 402*a-h* can be mapped with domain keywords 506 (FIG. 5) in vocabulary 500, and the resulting domain keywords 506 could be compared with formula designators 604 in vocabulary 600.

In any case, formula definition 606 provides a definition of a formula that is associated with formula designator 604. This formula can include any mathematical formula and/or function, statistical formula and/or function, probabilistic formula and/or function and/or the like. To this extent, given a formula designator 604 for a certain formula, formula definition 606 enumerates the variables, constants, functions, operators, etc., needed to evaluate the formula associated with the formula designator. As such, formula description 606 can include one or more operators 612*a*, 612*b*. Each of operators 612*a*, 612*b* can detail a mathematical process that is used to evaluate the formula. For example, formula entry 602*c* includes the operator 612*a* "List" while formula entry 602*d* includes the operator 612*b* "Sum." It should be understood that other types of operators could be envisioned and could include any function now known or later developed for transforming one value or set of values into another. Further, it should be understood that a plurality of operators could be included in the same formula definition.

Also included in formula definition 606 can be one or more formula terms 610*a-i*. Formula terms 610*a-i* supply the values that will be evaluated using the operations 612*a-b* in the formula defined by formula definition 606 to obtain a solution or solution set. To this extent, formula terms 610*a-i* could include numerical values, alphanumeric values, and/or any other value for which an evaluation is desired.

In any event, referring back to FIG. 1 in conjunction with FIGS. 4 and 6, formula term mapping module 144, as executed by computer system 102, can map a domain keyword 506 (FIG. 5) to a set of formula terms 610*a-i* associated with a retrieved formula designator 604. To this extent, if a formula designator 604 is retrieved, as corresponding to a query term 402*a-h* in query 400 and/or a domain keyword 406 that has previously been found to correspond to the query term 402*a-h*, formula term mapping module 144 can find other query terms 402*a-h* within query 400 that can be used to evaluate the formula. In an embodiment, the formula definition 606 that corresponds to the retrieved formula designator 604 can be evaluated to generate a set of formula terms 610*a-i*. This set of formula terms 610*a-i* would include all formula terms 610*a-i* in the particular formula entry 602*a-d* that contains the retrieved formula designator 604. For example, suppose query term 402*c* "doing best in" in query 400 is evaluated to correspond to formula designator 604 for entry 602*a* "average revenue." The formula definition 606 for entry 602*a* could be evaluated to generate formula term 610*a* "Total Revenue" and formula term 610*b* "Time Period." Further, one or more formula terms 610*a-i* could correspond to a formula designator 604 for another formula entry 602*a-d*. For example, in evaluating the formula entry 602*a* associated with formula designator 604 "Average Revenue," formula term 610*a* "Total Revenue" could correspond to formula designator 604 "Total Revenue" in formula entry 602*d*. Formula terms 610*h-i* associated with this formula designator 604 could then be generated and evaluated with respect to query terms 402*a-h* in query 400. For example, query terms T1 . . . Tn could be found to correspond to query term 402*f* "sales."

Once the formula terms 610*a-i* have been generated, query terms 402*a-h*, including but not limited to those that have been matched with a domain keyword 506 (FIG. 5), that are proximate to the retrieved formula designator 604 can be evaluated to determine whether a query term 402*a-h* corresponds to one of the generated formula terms 610*a-i*. In performing such an evaluation, weighting factors such as the distance between the query term 402*a-h* and formula designator 604 within query 400, or the like can be taken into account. Further, if no matching query term 402*a-h* is found, a default formula term 614 can be substituted if available. The formula term or terms 610*a-i* for which corresponding query terms 402*a-h* are found can be mapped to the query terms 402*a-h*. Based on the mapping, a determination can be made as to whether all of the formula terms 610*a-i* in the formula entry 602*a-d* associated with the retrieved formula designator 504 have been mapped. If all formula terms 610*a-i* have not been mapped, the unmapped formula term(s) 610*a-i* could be inserted into the query 400 for purposes of the search.

Referring again to FIG. 1, weighted boosting creator module 146, as executed by computer system 102, can create a unique weighted boosting for some or all of the query terms 402*a-h*. As stated previously, this boosting increases (or decreases) the relative importance assigned to the entity (e.g., query term 402*a-h*, query phrase, indexed field, indexed document, and/or the like). This boosting can influence the results of the search. Thus, all other things being equal, results matching a query term 402*a-h*, for example, with a higher boost value would be scored higher by the search engine. As applied to query terms 402*a-h*, this can be accomplished by providing a boost value to one particular set of query terms 402*a-h* that is different from the boost value that is assigned to a different set of query terms 402*a-h*. As such, weight boost creator module 146 can, at the query level, arrive at a query 400 that has the type of query terms 402*a-h* that are of greater importance emphasized while those query terms 402*a-h* having types deemed to be less important can receive lesser or no emphasis.

For example, it could be determined that a query term 402*a-h* that corresponds to a formula designator 604 for which all formula terms 610*a-i* were able to be mapped to query terms 402a-h and/or the associated query terms 402a-h should have the highest importance. In this case, such a query term 402a-h could be assigned a relatively high boost value, for example of 10. In contrast, a query term 402a-h that corresponds to a formula designator 604 for which all formula terms 610a-i were not able to be mapped and any associated formula terms 402a-i could be determined to have a lower importance and assigned a relatively lower boost value, say of 5. Further, any query terms 402a-h which are not formula terms 610a-i but for which a domain keyword 506 could be found could be determined to have an importance that is intermediate to the above two examples and assigned a boost value of 7 while query terms 402a-h for which no domain keyword was found could be determined to be the least important and be assigned a boost value of 0 (or 1). Such a boosting would emphasize fully populated formulas and terms found in the business domain vocabulary 500 while de-emphasizing only partially populated formulas and unknown terms. In the alternative, weighted boosting creator module 146 could make a determination as to which query terms 402a-h to boost based on certain factors pertaining to the query 400 is formed. These factors can be used to generating a boosting strategy dynamically and/or to select from among a set of previously configured boosting strategies. As such, factors used to generate and/or select such a boosting strategy could include characteristics of the user 152 that is making the query, such as the identity, position, group including the person, and/or the like. For example, one or more query terms 402a-h that pertain to more detail-related items might receive a greater boost value if the user was someone in accounting while more "big picture" query terms 402a-h could be boosted more for someone who was in a management role. Other factors could include such characteristics as the machine and/or software application used to make the query 400, the point in time (e.g., year, time of year, day, time of day, etc.) that the query was made, and/or any factor that could influence what results a user would wish to be returned.

Referring again to FIG. 1, dataset searching module 148, as executed by computer system 102, can search data network 200 using a structured search query. In forming this structured search query, dataset searching module 148 can included boosted terms, such as formula designators 604 and domain keywords 506. In addition, the structured search query can include query terms 402a-h for which no corresponding domain keyword 506 or formula designator 604 was found.

In any case, such a boosted structured search query can yield results that are more likely to be helpful based on the boosting of the dataset being searched. For example, dataset description 300 could be accessed and a search of dataset description 300 can be made based on the domain keywords 506 and other query terms 402a-h in the structured search query. Because the structured search query has domain keywords 506 that match the names of entries 302 in dataset description 300, the query becomes more likely to yield useful results. The results of such a search can be used to evaluate any formulas that are associated with any formula designator in the structured search query. Further, the set of values that is returned can be boosted based not only on the boosting in the structured search query and the boosting in the dataset description 300. This boosting can be static, such as the boosting described in conjunction with FIG. 2 or, in the alternative, can be dynamically generated and/or selected from a set of boost strategies. In either case, the generation and/or selection can be based on factors pertaining to the query 400 such as those described above, including, but not limited to a user identity, a user position, a user group, a software application used, or a point in time. The result can be a ranking of the solution set that is based on the boosting. These returned value sets can be linked with data descriptors and/or with other value sets having corresponding data descriptors and the linking, data descriptors and solution set can be returned to the user.

Figure 7:
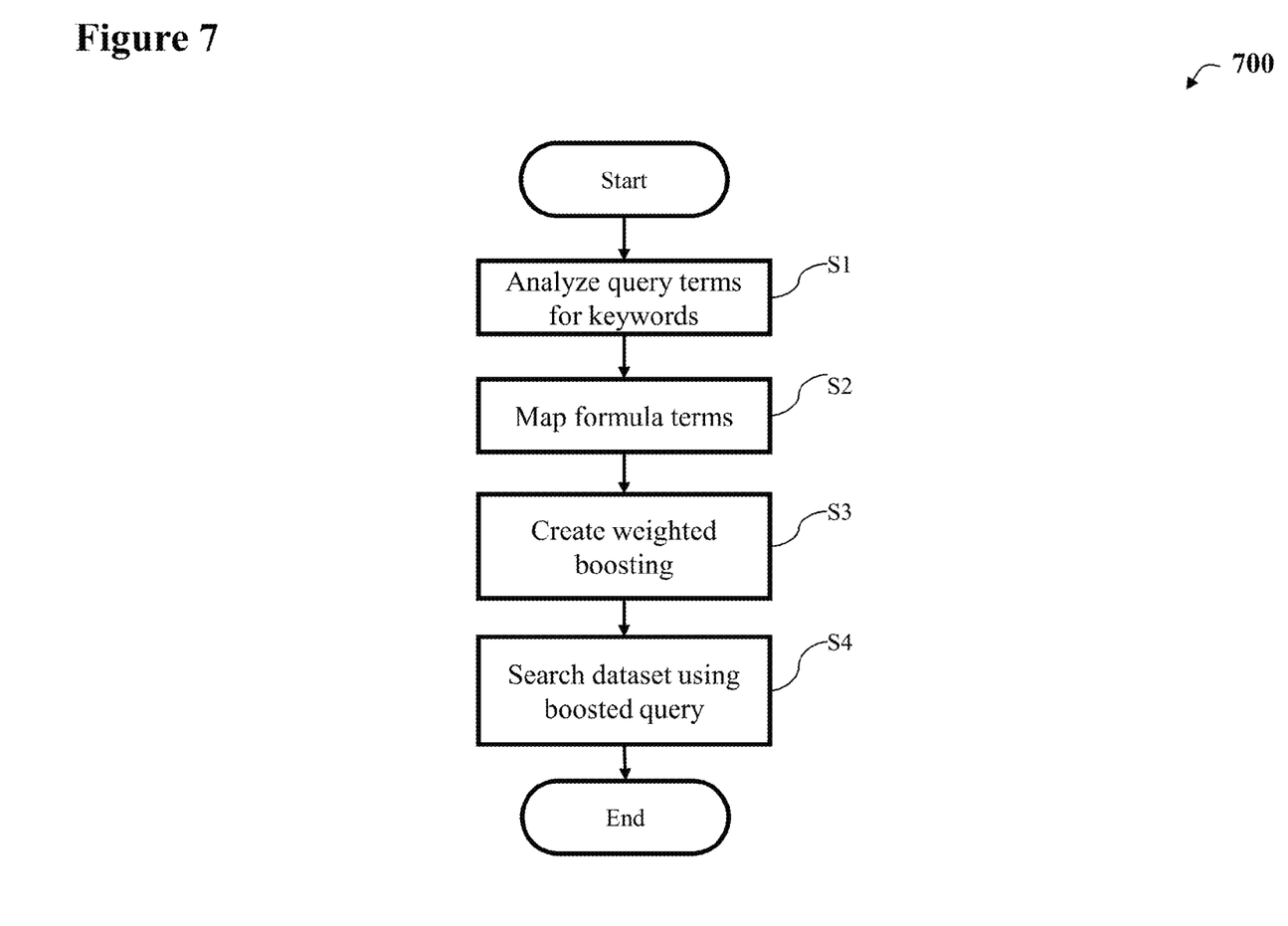
FIG. 7 shows an example flow diagram according to embodiments of the invention.

Turning now to FIG. 7, an example flow diagram according to embodiments of the invention is shown. As illustrated in FIG. 6 in conjunction with FIG. 1, in S1, ranked query term analyzer module 142, as executed by computer system 102, analyzes each query term 402a-h in a query 400. Such an analysis can be performed regardless of the format in which the query is formed. Because of this, even a natural language query can be evaluated. This analysis can be used to determine whether any particular query term 402a-h in the query corresponds to a domain keyword 506 and/or a formula designator 604. In S2, formula term mapping module 144, as executed by computer system 102, maps a domain keyword to a set of formula terms associated with a retrieved formula designator 604. This mapping can be accomplished by mapping formula terms 610a-i in a vocabulary 600 with query terms 402a-h that are proximate to the found formula designator 604. In S3, weighted boosting creator module 146, as executed by computer system 102, creates a unique weighted boosting for each of the domain keywords 506, the formula designator 604, and the mapped formula terms 610a-i. In S4, dataset searching module 148, as executed by computer system 102, searches the dataset using a structured search query that includes all of the boosted terms and any remaining query terms that do not correspond to one of the boosted terms. This search can be performed against a dataset that is also boosted, as shown in FIG. 2. The resulting returned dataset can be ranked based on the boosting of the structured search query and the dataset and can include linkings and descriptors that can help in interpretation of the data.

While shown and described herein as a method and system for retrieving data, it is understood that aspects of the invention further provide various alternative embodiments. For example, in one embodiment, the invention provides a computer program fixed in at least one computer-readable medium, which when executed, enables a computer system to retrieve data. To this extent, the computer-readable medium includes program code, such as data retrieval program 140 (FIG. 1), which implements some or all of a process described herein. It is understood that the term "computer-readable medium" comprises one or more of any type of non-transitory tangible media of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code, such as data retrieval program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for retrieving data. In this case, a computer system, such as computer system 120 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, if and where used herein do not denote any order, quantity, or importance, but rather are used to distinguish one element from another, and the terms "a" and "an" herein do not denote a limitation of quantity, but rather denote the presence of at least one of the referenced item. The modifier "approximately", where used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for retrieving data, comprising:
analyzing each query term of a format-independent query for data retrieval to determine whether the query term corresponds to at least one of: a domain keyword or a formula designator;
   wherein in the case that at least one domain keyword is retrieved as corresponding to the query term, mapping the retrieved domain keyword to the query term such that the at least one retrieved domain keyword is substituted for the query term in the format-independent query,
   wherein in the case that at least one formula designator is retrieved as corresponding to the query term, mapping a set of formula terms associated with the retrieved formula designator to the query term such that the at least one retrieved formula designator is substituted for the query term in the format-independent query,
   wherein in the case that both at least one domain keyword and at least one formula designator are retrieved as corresponding to the query term, mapping the set of formula terms associated with the at least one of the retrieved formula designators to the at least one of the retrieved domain keywords of the query term;
creating a unique weighted boosting for each of the retrieved domain keywords, the retrieved formula designators, and the mapped formula terms; and
searching a dataset using a structured search query that includes all weighted boosted terms and any remaining query terms that do not correspond to one of the weighted boosted terms.

2. The method of claim 1, in the case that both the at least one domain keyword and the at least one formula designator are retrieved as corresponding to the query term, the mapping further comprising:
   evaluating a formula definition associated with the retrieved formula designator to generate a set of formula terms;
   evaluating domain keywords corresponding to the formula designator to determine whether a corresponding domain keyword corresponds to one of the set of formula terms;
   mapping the query terms to each of the corresponding formula terms;
   determining whether all of the set of formula terms have been mapped; and
   based on a determination that all of the set of formula terms have not been mapped, inserting an unmapped formula term from the set of formula terms into the query.

3. The method of claim 1, wherein the query is in a natural language format.

4. The method of claim 1, the analyzing further comprising:
   searching a business domain vocabulary to determine whether the query term corresponds to a domain keyword; and
   searching at least one of the business domain vocabulary or a statistical vocabulary to determine whether the query term corresponds to a formula designator and returning a structural mapping that includes one or more constituent formula terms if a match is found.

5. The method of claim 1, the searching further comprising:
   accessing a dataset description of a plurality of datasets, the dataset description including data descriptors that describe a value set in the plurality of datasets; and
   comparing the boosted terms and the remaining query items with the data descriptors;
   evaluating value sets associated with domain keywords associated with a particular formula designator;
   boosting a returned value set based on a designation type of the data descriptor corresponding to the returned value set, the boosting assigning a first boost value to any data descriptors having a preferred designation type that is greater than a second boost value assigned to data descriptors having an inferior designation type;
   ranking a solution set based on the boosted terms and the boosted return value set; and
   returning the ranked solution set.

6. The method of claim 5, wherein the boosting determines which designation type of a set of designation types has a preferred designation type based on at least one of: a user identity, a user position, a user group, a software application used, or a point in time, wherein the set of designation types include: key name, column name, column description, value description, table name, and table description.

7. The method of claim 5, further comprising:
   linking a first returned value set having a particular data descriptor with a second returned value set having a corresponding data descriptor; and
   returning the linking and the data descriptors with the ranked solution set.

8. The method of claim 5, further comprising providing a graphical user interface that enables a user to add, delete, and modify data descriptors in the dataset description.

9. A system for retrieving data, comprising at least one computer device that performs a method, comprising:
- analyzing each query term of a format-independent query for data retrieval to determine whether the query term corresponds to at least one of: a domain keyword or a formula designator;
  - wherein in the case that at least one domain keyword is retrieved as corresponding to the query term, mapping the retrieved domain keyword to the query term such that the at least one retrieved domain keyword is substituted for the query term in the format-independent query,
  - wherein in the case that at least one formula designator is retrieved as corresponding to the query term, mapping a set of formula terms associated with the retrieved formula designator to the query term such that the at least one retrieved formula designator is substituted for the query term in the format-independent query,
  - wherein in the case that both at least one domain keyword and at least one formula designator are retrieved as corresponding to the query term, mapping the set of formula terms associated with the at least one of the retrieved formula designators to the at least one of the retrieved domain keywords of the query term;
- creating a unique weighted boosting for each of the retrieved domain keywords, the retrieved formula designators, and the mapped formula terms; and
- searching a dataset using a structured search query that includes all weighted boosted terms and any remaining query terms that do not correspond to one of the weighted boosted terms.

10. The system of claim 9, in the case that both the at least one domain keyword and the at least one formula designator are retrieved as corresponding to the query term, the mapping further comprising:
- evaluating a formula definition associated with the retrieved formula designator to generate a set of formula terms;
- evaluating domain keywords corresponding to the formula designator to determine whether a corresponding domain keyword corresponds to one of the set of formula terms;
- mapping the query terms to each of the corresponding formula terms;
- determining whether all of the set of formula terms have been mapped; and
- based on a determination that all of the set of formula terms have not been mapped, inserting an unmapped formula term from the set of formula terms into the query.

11. The system of claim 9, wherein the query is in a natural language format.

12. The system of claim 9, the analyzing further comprising:
- searching a business domain vocabulary to determine whether the query term corresponds to a domain keyword; and
- searching at least one of the business domain vocabulary or a statistical vocabulary to determine whether the query term corresponds to a formula designator and returning a structural mapping that includes one or more constituent formula terms if a match is found.

13. The system of claim 9, the searching further comprising:
- accessing a dataset description of a plurality of datasets, the dataset description including data descriptors that describe a value set in the plurality of datasets; and
- comparing the boosted terms and the remaining query items with the data descriptors;
- evaluating value sets associated with domain keywords associated with a particular formula designator;
- boosting a returned value set based on a designation type of the data descriptor corresponding to the returned value set, the boosting assigning a first boost value to any data descriptors having a preferred designation type that is greater than a second boost value assigned to data descriptors having an inferior designation type;
- ranking a solution set based on the boosted terms and the boosted return value set; and
- returning the ranked solution set.

14. The system of claim 13, wherein the boosting determines which designation type of a set of designation types has a preferred designation type based on at least one of: a user identity, a user position, a user group, a software application used, or a point in time, wherein the set of designation types include: key name, column name, column description, value description, table name, and table description.

15. The system of claim 13, the method further comprising:
- linking a first returned value set having a particular data descriptor with a second returned value set having a corresponding data descriptor; and
- returning the linking and the data descriptors with the ranked solution set.

16. The system of claim 13, the method further comprising providing a graphical user interface that enables a user to add, delete, and modify data descriptors in the dataset description.

17. A computer program product stored on a non-transitory computer readable storage medium, which, when executed performs a method for retrieving data, comprising:
- analyzing each query term of a format-independent query for data retrieval to determine whether the query term corresponds to at least one of: a domain keyword or a formula designator;
  - wherein in the case that at least one domain keyword is retrieved as corresponding to the query term, mapping the retrieved domain keyword to the query term such that the at least one retrieved domain keyword is substituted for the query term in the format-independent query,
  - wherein in the case that at least one formula designator is retrieved as corresponding to the query term, mapping a set of formula terms associated with the retrieved formula designator to the query term such that the at least one retrieved formula designator is substituted for the query term in the format-independent query,
  - wherein in the case that both at least one domain keyword and at least one formula designator are retrieved as corresponding to the query term, mapping the set of formula terms associated with the at least one of the retrieved formula designators to the at least one of the retrieved domain keywords of the query term;
- creating a unique weighted boosting for each of the retrieved domain keywords, the retrieved formula designators, and the mapped formula terms; and
- searching a dataset using a structured search query that includes all weighted boosted terms and any remaining query terms that do not correspond to one of the weighted boosted terms.

18. The program product of claim 17, in the case that both the at least one domain keyword and the at least one formula designator are retrieved as corresponding to the query term, the mapping further comprising:

evaluating a formula definition associated with the retrieved formula designator to generate a set of formula terms;

evaluating domain keywords corresponding to the formula designator to determine whether a corresponding domain keyword corresponds to one of the set of formula terms;

mapping the query terms to each of the corresponding formula terms;

determining whether all of the set of formula terms have been mapped; and based on a determination that all of the set of formula terms have not been mapped, inserting an unmapped formula term from the set of formula terms into the query.

19. The program product of claim 17, wherein the query is in a natural language format.

20. The program product of claim 17, the analyzing further comprising:

searching a business domain vocabulary to determine whether the query term corresponds to a domain keyword; and searching at least one of the business domain vocabulary or a statistical vocabulary to determine whether the query term corresponds to a formula designator and returning a structural mapping that includes one or more constituent formula terms if a match is found.

21. The program product of claim 17, the searching further comprising:

accessing a dataset description of a plurality of datasets, the dataset description including data descriptors that describe a value set in the plurality of datasets; and comparing the boosted terms and the remaining query items with the data descriptors;

evaluating value sets associated with domain keywords associated with a particular formula designator;

boosting a returned value set based on a designation type of the data descriptor corresponding to the returned value set, the boosting assigning a first boost value to any data descriptors having a preferred designation type that is greater than a second boost value assigned to data descriptors having an inferior designation type;

ranking a solution set based on the boosted terms and the boosted return value set; and returning the ranked solution set.

22. The program product of claim 21, wherein the boosting determines which designation type of a set of designation types has a preferred designation type based on at least one of: a user identity, a user position, a user group, a software application used, or a point in time, wherein the set of designation types include: key name, column name, column description, value description, table name, and table description.

23. The program product of claim 21, the method further comprising:

linking a first returned value set having a particular data descriptor with a second returned value set having a corresponding data descriptor; and returning the linking and the data descriptors with the ranked solution set.

24. The program product of claim 21, the method further comprising providing a graphical user interface that enables a user to add, delete, and modify data descriptors in the dataset description.

25. A method for deploying an application for retrieving data, comprising:

providing a computer infrastructure being configured to:

analyze each query term of a format-independent query for data retrieval to determine whether the query term corresponds to at least one of: a domain keyword or a formula designator;

wherein in the case that at least one domain keyword is retrieved as corresponding to the query term, map the retrieved domain keyword to the query term such that the at least one retrieved domain keyword is substituted for the query term in the format-independent query, wherein in the case that at least one formula designator is retrieved as corresponding to the query term, map a set of formula terms associated with the retrieved formula designator to the query term such that the at least one retrieved formula designator is substituted for the query term in the format-independent query, wherein in the case that both at least one domain keyword and at least one formula designator are retrieved as corresponding to the query term, map the set of formula terms associated with the at least one of the retrieved formula designators to the at least one of the retrieved domain keywords of the query term;

create a unique weighted boosting for each of the retrieved domain keywords, the retrieved formula designator, and the mapped formula terms; and search a dataset using a structured search query that includes all weighted boosted terms and any remaining query terms that do not correspond to one of the weighted boosted terms.

* * * * *